US011063883B2

(12) United States Patent
Choi

(10) Patent No.: US 11,063,883 B2
(45) Date of Patent: *Jul. 13, 2021

(54) END POINT MULTIPLEXING FOR EFFICIENT LAYER 4 SWITCHING

(71) Applicant: Akamai Technologies, Inc., Cambridge, MA (US)

(72) Inventor: Byung K. Choi, Boston, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,499

(22) Filed: Jun. 4, 2019

(65) Prior Publication Data

US 2019/0288958 A1    Sep. 19, 2019

Related U.S. Application Data

(63) Continuation of application No. 14/973,999, filed on Dec. 18, 2015, now Pat. No. 10,313,270.

(60) Provisional application No. 62/093,543, filed on Dec. 18, 2014.

(51) Int. Cl.
*H04L 12/50* (2006.01)
*H04L 12/947* (2013.01)
*H04L 29/08* (2006.01)

(52) U.S. Cl.
CPC ............ *H04L 49/25* (2013.01); *H04L 69/326* (2013.01); *H04L 12/50* (2013.01)

(58) Field of Classification Search
CPC ....... H04L 49/25; H04L 69/326; H04L 47/11; H04L 49/90
See application file for complete search history.

(56) References Cited

U.S. PATENT DOCUMENTS

| | | | | |
|---|---|---|---|---|
| 7,142,509 B1* | 11/2006 | Rovner | ............ | H04L 29/06027 370/230 |
| 2006/0227811 A1* | 10/2006 | Hussain | ................. | H04L 49/90 370/503 |
| 2007/0223532 A1* | 9/2007 | Hwang | ................... | H04L 49/90 370/469 |
| 2009/0106446 A1* | 4/2009 | Lee | ....................... | H04L 5/1446 709/233 |
| 2015/0074683 A1* | 3/2015 | Singh | ..................... | H04L 47/11 719/312 |

* cited by examiner

*Primary Examiner* — Abdelnabi O Musa
(74) *Attorney, Agent, or Firm* — David H. Judson

(57) ABSTRACT

This disclosure provides for an enhancement to a transport layer switch and, in particular the management of end points. In this approach, a memory space, such as a large logical ring buffer, is shared by incumbent connections to facilitate a space multiplexing end point management scheme. Preferably, memory allocation in the memory space is done packet-by-packet dynamically. Because the memory space is shared by all admitted connections, packets belonging to the same connection are not necessarily located physically consecutive to each other. A packet indexing mechanism that implements a set of pointers ensures that consecutiveness for packets on the same connection is maintained. This approach to end point multiplexing provides significant benefits by improving resource utilization, and enabling a higher number of connections to be served.

17 Claims, 7 Drawing Sheets

END POINT MULTIPLEXING FOR EFFICIENT LAYER 4 SWITCHING

This application is a continuation of Ser. No. 14/973,999, filed Dec. 18, 2015, now U.S. Pat. No. 10,313,270, which application was based on and claimed priority to Ser. No. 62/093,543, filed Dec. 18, 2014.

BACKGROUND

Technical Field

This application relates generally to data packet switching.

Brief Description of the Related Art

Transport layer switches splice two OSI Layer 4 (L4) connections such that two users (hosts) at remote ends have an illusion they are connected directly without having an intermediary. A challenge to the transport layer switch therefore is to deal efficiently with quality differences of the two links over which the two different Layer 4 connections are constructed. When the effective link rates are significantly different, for example, between wired and wireless links, it is likely that one end point builds a large-size queue of pending packets, thereby creating an operating environment where memory space and CPU processing time are wasted. This problem is exacerbated in situations where the Layer 4 switch is required to handle a large number of connections.

BRIEF SUMMARY

This disclosure provides an enhancement to a transport layer switch and, in particular the management of end points. In this approach, a memory space, such as a large logical ring buffer, is shared by incumbent connections to facilitate a space multiplexing end point management scheme. Preferably, memory allocation in the memory space is done packet-by-packet dynamically. Because the memory space is shared by all admitted connections, packets belonging to the same connection are not necessarily located physically consecutive to each other. A packet indexing mechanism that implements a set of pointers ensures that consecutiveness for packets on the same connection is maintained. This approach to end point multiplexing provides significant benefits by improving resource utilization, and enabling a higher number of connections to be served.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
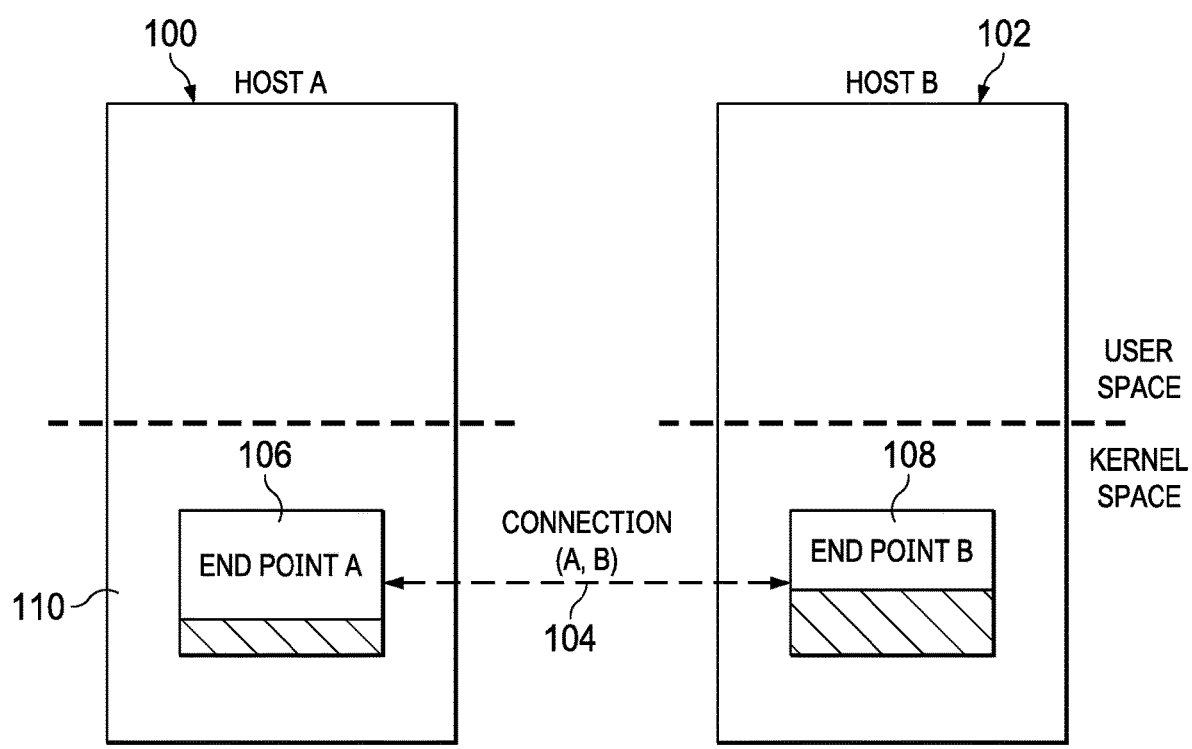
FIG. 1 depicts a pair of hosts each having an end point and a data packet connection between the hosts.

As used herein, an "end point" is a buffer space (in memory) for datagrams (data packets) and that is typically implemented in kernel (OS) space. A portion of an end point may be "occupied," meaning that it includes data, or empty, meaning that it does not include data. Data transfer from one host to another, e.g., on the Internet, typically is performed by creating two end points (datagram buffer spaces, one at each host), logically associating the two end points, and then coordinating sending and receiving activities at both sides. Subsequent data sending and receiving are then processed through the end points. In other words, a connection is established first, data transfer is followed, and then the connection (including the two end points) is torn down when the transfer is complete. FIG. 1 depicts a simple model of the connection. Here, host A 100 and host B 102 have established a connection 104 Conn$_{(a,b)}$ that is supported by the two end points EP$_a$ 106 and EP$_b$ 108. As depicted, typically the end points reside in operating system kernel space 110 in each respective host. Typically, a host is a computing machine having one or more hardware processors, system memory, an operating system, applications, utilities, and network interfaces.

As the traffic flows between the two hosts, the occupancy of the two end points by the waiting packets changes over time. In the snapshot depicted in FIG. 1, host 100 has less in-process packets (shadow area) in its buffer than host 102. Conversely, host 100 has more available space (white area) for future packets than host 102. There are several general points that can be observed with respect to a particular end point. Assuming that a CPU of the end point is not a performance bottleneck, when some white area of the end point constantly is not utilized during the data transfer, the end point is said to be under-utilized. The data transfer time has to be the same with a smaller size end point. In this circumstance, the throughput of the connection likely is network-constrained; in other words, the network path does not have enough bandwidth to saturate the end point. On the other hand, when the end point does not have some white area during the data transfer, the throughput of the connection is probably end point-constrained. The data transfer time has to be shorter with a larger size end point. Thus, an optimal size of the end point should realize two goals; first, the throughput should not be end point-constrained; second, the size of white area should remain small. When the dynamic behavior of general Internet traffic is considered, however, it is not likely that a single fixed size for the buffer can satisfy the two goals for all connections, as different connections typically have different traffic characteristics.

Figure 2:
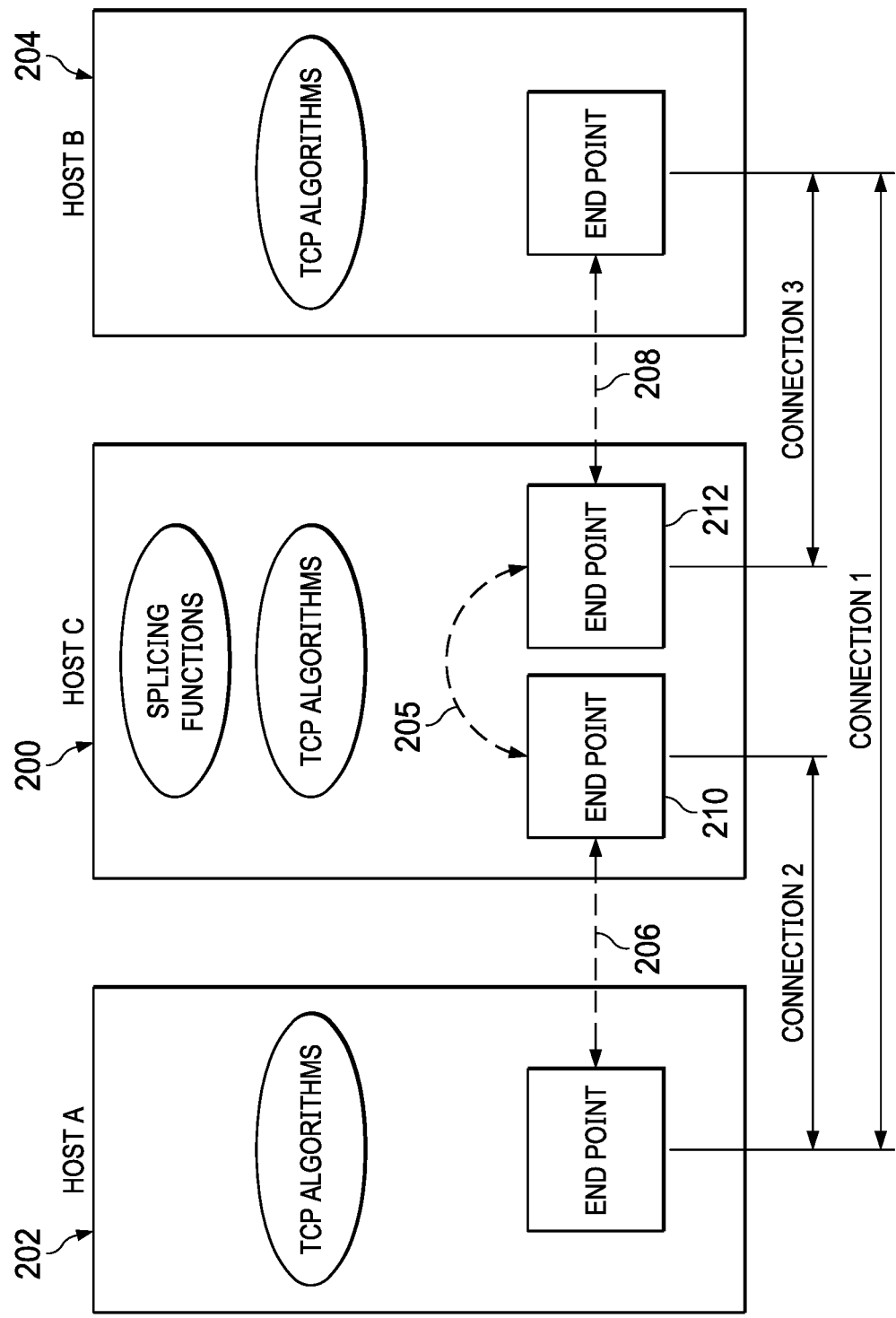
FIG. 2 is a block diagram of a transport layer switch in which the techniques of this disclosure may be implemented.

FIG. 2 depicts a model of the common implementation of a transport layer switching operating environment. In this drawing, Host C 200 is the switch between Host A 202 and B 204. More specifically, a splicing function in Host C is the switch between the two connections, one connection 206 between Host A and C, and another connection 208 between Host C and B. The splicing functionality 205 acts with respect to TCP end point 210 and 212 at Host C to seamlessly connect (splice) $TCP_{(a,c)}$ and $TCP_{(c,b)}$. The splicing functionality 205 transfers packets from one end point to another in the same host. Each packet flow, sometimes referred to as a connection segment, is terminated before being transferred to some other flow (connection). Host C is not necessarily just a single computing machine; indeed, the basic switching notion shown in FIG. 2 may be generalized as a distributed environment wherein an application layer overlay (comprising a large number of separate machines) on top of the Internet handles a massive number of TCP pairs. Thus, and with reference to FIG. 3, host C is FIG. 2 is depicted as a large-scale transport layer switch 300, effectively as an N×N switch, where N is the number of end points currently served. Here, the task of the switch is to transfer packets from one end point to another in the same single TCP pair as efficiently as possible. For Layer 3 routers and Layer 2 switches, the N×N switch typically is implemented in custom hardware in a form of ASIC (application-specific integrated circuit). In the L4 transport layer switch, however the processing unit 302 acts like a virtual switch fabric using an application layer buffer 304 as the switching device(s). In L4 switching, the packet switching is performed only between two end points (PORT in the figure) belonging to a same pair of TCP segments.

Figure 4:
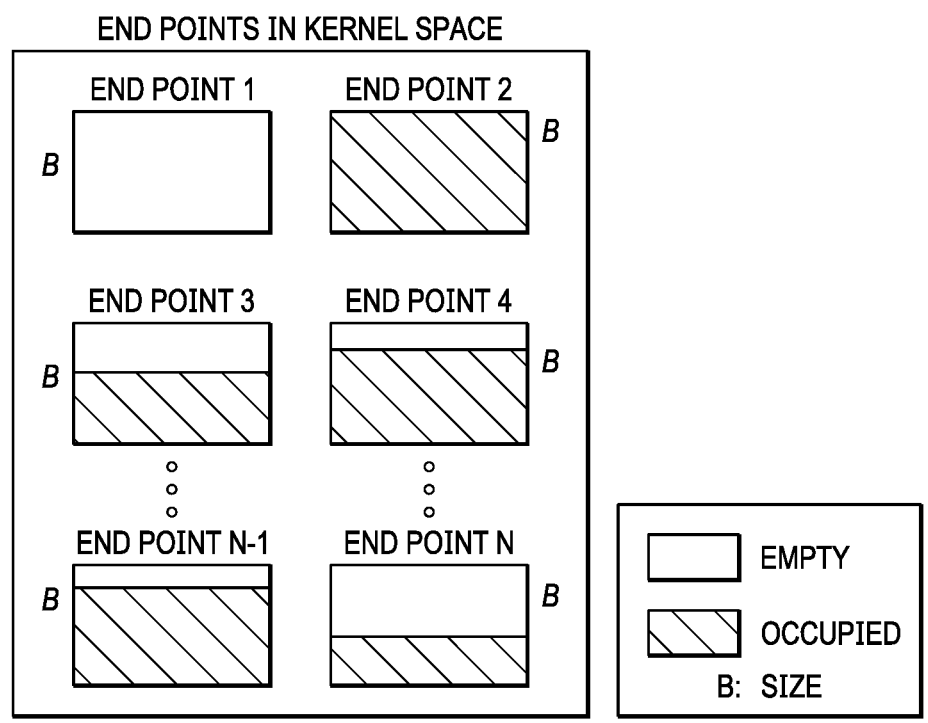
FIG. 4 illustrates the problem of memory fragmentation that is addressed by this disclosure.

In situations where the transport layer switch has to support as many connection pairs as possible, the switch can easily face many challenges. A straightforward approach in such a situation is to use a single fixed buffer size B for all end points, where the value of B is heuristically but carefully chosen such that a throughput of a majority of connections is not end point-constrained while the unused portion (white area) of each end point is not large. FIG. 4 depicts a likely snapshot of end point utilization in this situation. As seen, some portion of each end point is free (white) while the other portion (shaded) is occupied by packets waiting for processing, all due to different characteristics of different traffic flows (connections). As noted above, and considering the dynamic nature of Internet traffic, it is highly likely that many end points would not use a good portion of the space at times during the data transfer. This problem is sometimes referred to end point internal fragmentation. This fragmentation problem is bound to occur (absent the technique of this disclosure) because of the general difficulty of predicting the use pattern of discrete resources by the applications that require the packet switching.

Figure 3:
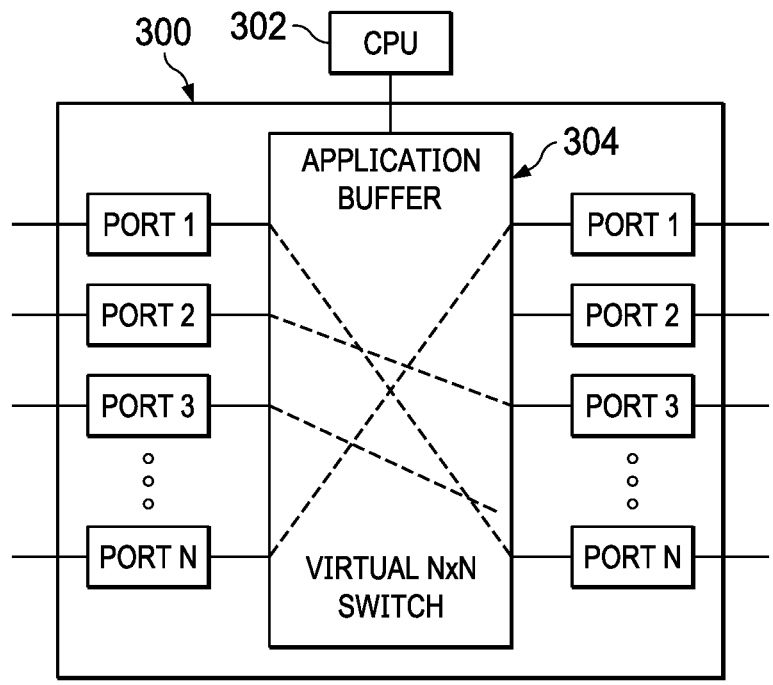
FIG. 3 depicts the transport layer switch in additional detail.

In the switch shown in FIG. 3, packet switching between two end points through the application buffer incurs some overhead. This overhead is based on the two necessary memory copies, once from one end point to the application buffer, and another for the reverse direction. In addition, a context switch from the user to kernel mode is needed whenever the packet comes from the application buffer to the end point. In addition, a well-designed switch must operate effectively irrespective of link quality differences. In particular, the links upon which the two TCP segments are built on can be different in terms of bandwidth. As these differences become bigger, internal fragmentation and switching overhead become more problematic. This is because the quality difference generally is translated to larger overall capacity of the switch. The switch needs additional buffer space to accommodate the differences in link rates, the degree to which traffic is bursting, and delay jitter. This challenge is even greater when the degree of link quality difference varies substantially in a short time interval. For example, the cellular wireless link exhibits patterns of very high variation in the common link quality metrics (bandwidth, delay and jitter). When a transport layer switch is placed between such a wireless link and a broadband wired backbone link, the difference and the dynamic variance of the difference in effective bandwidth and latency between the two links are likely to maximize, creating a challenging environment for the transport layer switch to accommodate the high variance without losing the efficiency in resource provisioning. With such a high variance, increasing the buffer size will not address the issue, because the number of TCP pairs that can be supported will become memory-constrained sooner, and the CPU will be more frequently subject to a series of bursty tasks in an unpredictable manner. As a side effect, the number of persistent connections a switch can maintain will be fewer.

The technique of this disclosure addresses these issues, as will now be described.

Transport Layer Switch with End Point Multiplexing

According to this disclosure, an end point-multiplexing (EPM) scheme preferably uses a relatively small allocation unit, sometimes referred to as a "slot." Preferably, the slot is just big enough to contain one max size Layer 4 packet and an EPM-internal header, which is described below.

An end point management system that implements this approach is given a memory space T. With the given memory space, the system runs a set of algorithms (described below) that try to maximize the buffer space utilization as measured, for example, by the achievable number of connection pairs N under a given set of constraints: minimize negative impact to memory space utilization from the link quality differences and the random variance of the differences, minimize the overhead of switching functions between two end points via the application buffer, minimize the number of connections that are end point-constrained in terms of data transfer time or throughput, and minimize the overhead of internal fragmentation.

Figure 5:
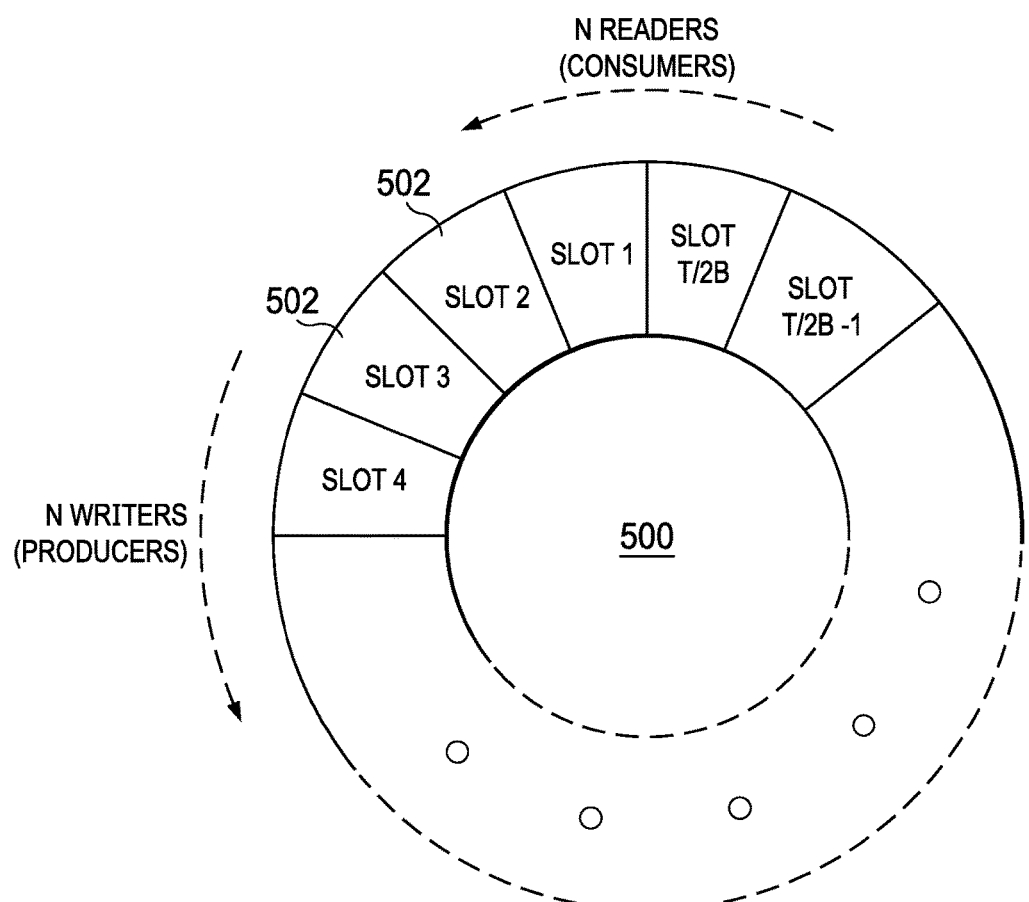
FIG. 5 depicts a shared memory in the form of a logical ring buffer that is used to manage end points according to this disclosure.

According to the scheme, EPM re-structures the given space T as a logical ring buffer 500, as depicted in FIG. 5, to which N users (N connection pairs) write to and read from slots 502. A particular slot to which writing and reading occurs is given by a pointer, as described below. As a skilled person will appreciate, EPM does not allocate two end points to switch two connections; rather, it switches the in-order packets from one connection to the order by simply letting the other use the in-order packets in place and without moving those packets to another end point. So, once written in the logical ring buffer, packets need (and preferably do) not move around. They stay in place until they are taken (read and sent) out to the other connection permanently. Because the end point is implemented as a single shared large logical ring buffer, and because the ring buffer is shared by admitted connections (preferably all of them), packets belonging to the same connection are not necessarily located physically consecutive to one another. To ensure consecutive packets are properly managed, the system implements a pointer mechanism. Preferably, each end point pair maintains a set of pointers for correct reading and writing from the slots in the ring buffer.

Preferably, each connection maintains its own TCP parameter values for delivery guarantee. One parameter set, belonging to one TCP connection, does not interfere with those of other TCP connections. The regular TCP activities including congestion avoidance and flow control are independent of EPM. As such, EPM provides for various functions to control the manner by which an incoming packet from a connection is written into the ring buffer, and the manner by which the in-order packets from one connection are switched to the other connection in the same pair.

The following section provides additional details of preferred algorithms for these functions:

(1) Connection
  (a) ID: use the current model, namely, host address (Layer 3 ID) and port number (end point ID unique to the local system);
  (b) TCP parameters for delivery guarantee, congestion control and flow control:
    inherit initial values from those of an algorithm (Fixed$_B$) such that that each connection has the same independent operational conditions as in Fixed$_B$. So, each connection has an illusion that it runs on Fixed$_B$, which allocates an end point of fixed size B to all connections under the limit of T. The maximum number of connection pairs that Fixed B can support is $N_F$=T/2B.

Figure 6:
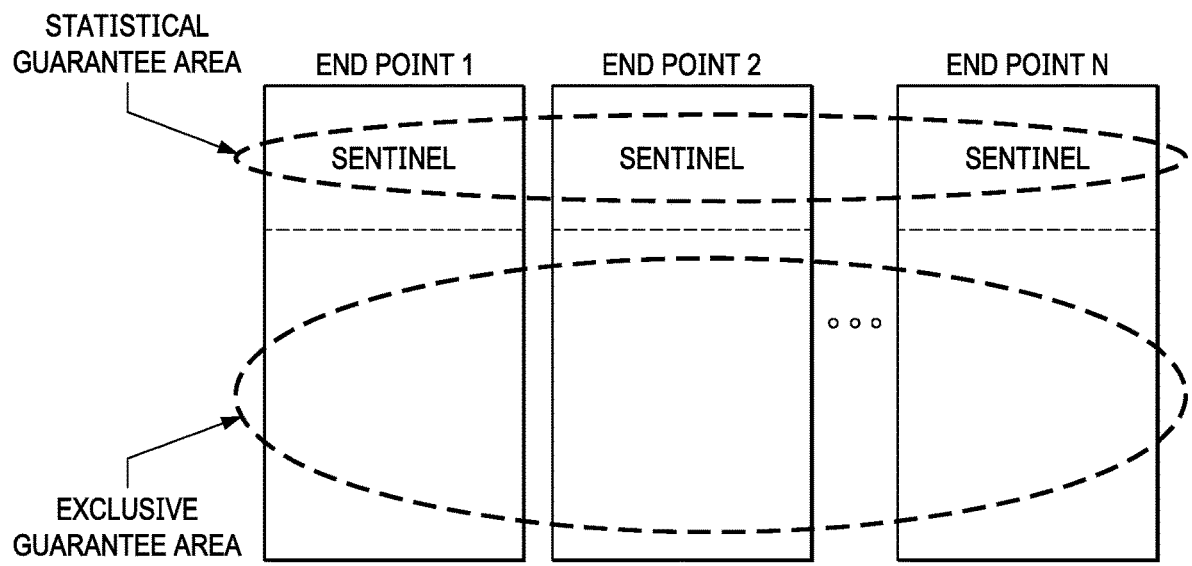
FIG. 6 depicts a scheme for logical space allocation that is implemented in the multiplexing scheme of this disclosure.

(2) End Point Allocation
  (a) structure: the end point is structured as a collection of consecutive slots;
  (b) allocation unit: slot=maximum transfer unit (MTU)+internal header per TCP packet;
  (c) location: determined by a global pointer $P_g$ pointing to the next available slot anywhere in T for a packet writing;
  (d) consecutive-ness: waiting packets belonging to the same connection are logically consecutive, not physically, and this is maintained by the slot internal header;
  (e) special memory space Ssentinel: is booked out of T.
  (f) number of sentinel slots:
    $N^g_{sentinel}=S_{sentinel}$/slot
  (g) each end point's share of $S_{sentinel}$,
    $N^i_{sentinel}=N^g_{sentinel}/N_F$
  (h) FIG. 6 shows a model of end point allocation for multiplexing. As seen, the sentinel space $S_{sentinel}$ is reserved for statistical multiplexing. Note that the actual space allocation preferably is done packet by packet. The memory block for each end point in FIG. 6 thus is only logical.

Figure 7:
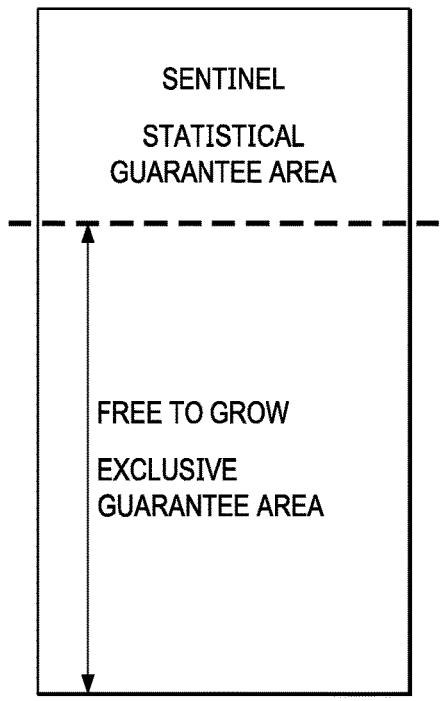
FIG. 7 depicts an end point write without saturation state.

(3) Free Space Tracking
  (a) global
    (1) total slots: $N^g_T$=T/slot
    (2) occupied slots: $N^g_{occupied}$, updated each time when a packet comes or leaves
    (3) available slots: $=N^g_{empty}=N^g_T-N^g_{occupied}$, updated each time when a packet comes or leaves;
  (b) per connection
    (1) space booked for connection pair i: $S_i$
    (2) initial space booked for each admitted pair: $S_i=(2\times B)-N^g_{sentinel}/N_F$
    (3) total slots initially booked:
      $N^i_{whole}=(2\times B)$/slot
      $N^i_t=(2\times B)$/slot$-N^g_{sentinel}/N_F$
    In FIG. 6, $N^i_t$ is represented as Exclusive Guarantee Area, while $N^i_{whole}$ is implied as Exclusive Guarantee Area+Statistical Guarantee Area.
    (4) occupied slots: $N^i_{occupied}$ updated each time when a packet comes or leaves
    (5) available slots: $N^i_{empty}=N^i_t-N^i_{occupied}$, updated each time when a packet comes or leaves (4) Packet-Write without Saturation of $S_i$
  (a) this is the case when a new packet arrives from connection pair i, and the following condition holds: $N^i_{empty}>0$
  (b) get the next available slot from $P_g$,
  (c) write the packet at the slot
  (d) update the slot internal header and space tracking variables
    (1) $N^i_{occupied}=N^i_{occupied}+1$
    (2) $N^i_{empty}=N^i_{empty}-1$
  (e) FIG. 7 shows the buffer area to which this case corresponds.

Figure 8:
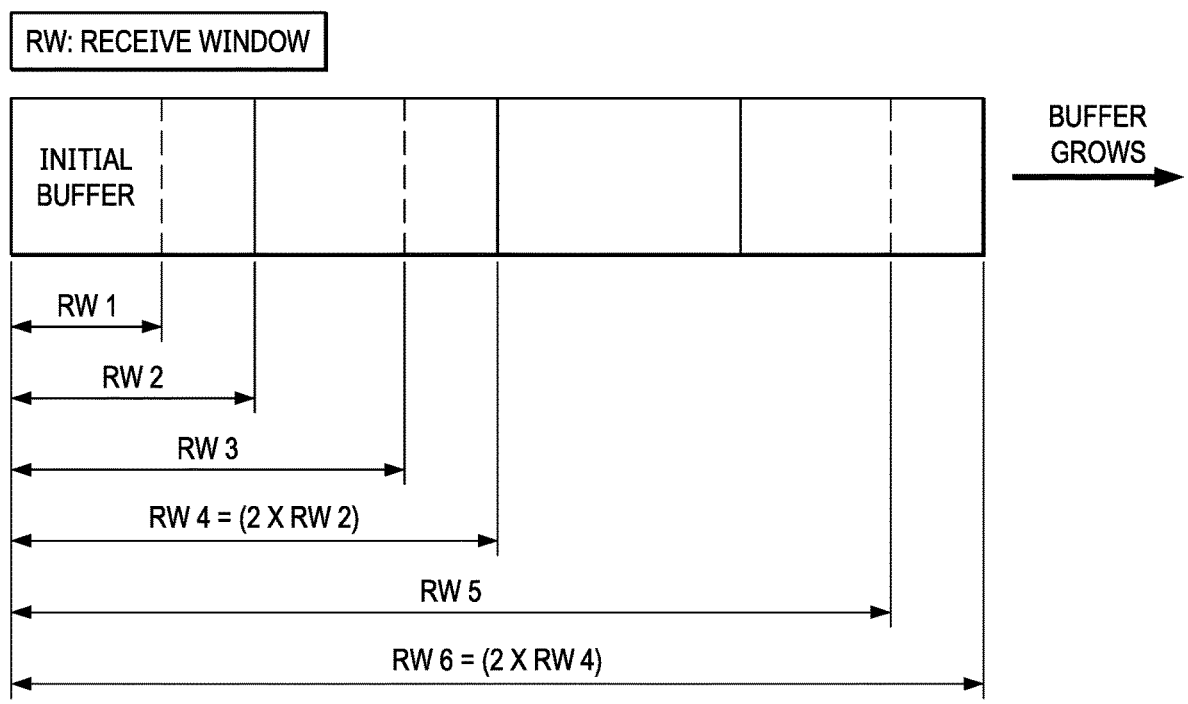
FIG. 8 depicts an end point write with saturation state.

(5) Packet-Write with Saturation of $S_i$
  (a) when a new packet arrives from connection pair i,
  (b) if the following condition holds: $N^i_t \leq N^i_{occupied} < N^i_{whole}$
    (1) get the next available slot from $P_g$,
    (2) write the packet at the slot
    (3) update the slot internal header and space tracking variables
      (A) $N^g_{sentinel}=N^g_{sentinel}-N^g_{sentinel}/N_F$
      (B) $N^i_t=N^i_{whole}$
      (C) $N^i_{occupied}=N^i_{occupied}+1$
      (D) $N^i_{empty}=N^i_{empty}-1$
  (c) else, if these two conditions hold:
    ($N^i_{occupied}<(N^i_{whole}-1)$)
    ($N^g_{sentinel}>N^i_{whole}$)
  (d) do the following
    get the next available slot from $P_g$,
    write the packet at the slot
    update the slot internal header and space tracking variables
      (1) $N^g_{sentinel}=N^g_{sentinel}-N^i_{whole}+N^g_{sentinel}/N_F$
      (2) $N^i_{whole}=2\times N^i_{whole}$
      (3) $N^i_t=N^i_{whole}-N^g_{sentinel}/N_F$
      (4) $N^i_{occupied}=N^i_{occupied}+1$
      (5) $N^i_{empty}=N^i_{empty}-1$
  (e) else if these two conditions hold:
    ($N^i_{occupied}<(N^i_{whole}-1)$)
    ($N^g_{sentinel}>N^i_{whole}$)
  (f) do the following depending on the application
    (1) either the connection pair stays temporarily end point-constrained in data transfer time,
    (2) or the connection pair can use the application buffer space in user space of the local system
  (g) FIG. 8 depicts a scenario where the buffer grows after initial allocation. As seen, the buffer grows with the same pattern each time.
    (1) Initially, the receive window is RW 1
    (2) Upon the exhaustion of RW 1, it adds the sentinel portion, which becomes a new receive window RW 2
    (3) Further growth doubles the window size with the pattern RW 3=(2×RW 2)−Sentinel
    (4) After RW 3, it adds the sentinel portion, which becomes RW 4
    (5) After RW 4, it doubles the windows size again preferably with the same pattern, RW 5=(2×RW 4)−Sentinel
    (6) After RW 5, it adds the sentinel portion, which becomes RW 6

(6) Packet-Read (a) when a packet is switched (consumed) permanently to the other connection in connection pair i, the slot is reclaimed to be empty
(b) the space tracking variables are updated accordingly
  (1) $P_g$ updates the slot availability map
  (2) $N^i_{occupied} = N^i_{occupied} + 1$
  (3) $N^i_{empty} = N^i_{empty} - 1$
(C) if $N^i_{occupied} < (N^i_{whole}/2)$
  (1) $N^i_{whole} = N^i_{whole}/2$
(7) Connection Admission
  (a) when a new connection request comes
  (b) if the number of current active connections is smaller than $N_F$
    accept
  (c) else if $N^g_{sentinel} > 2B$
    $N^g_{sentinel} = N^g_{sentinel} - 2B + N^g_{sentinel}/N_F$
    accept
  (d) Otherwise
    reject due to space resource exhaustion Synchronization Control In the previous subsection, it is assumed that every writer shares one single global pointer from which they know exactly where to write an incoming packet. EPM solves any synchronization problem associated therewith preferably by leveraging the conventional serialization function that is provided at the device driver level. In particular, communication between the operating system kernel and the device driver is serialized, packet-by-packet, in an exclusive manner. No two packets are written or read at the same time by the device driver. As will be seen, EPM takes advantage of the effective (de)-multiplexer of the device driver.

The following provides additional details regarding a preferred synchronization control routine.

Figure 9:
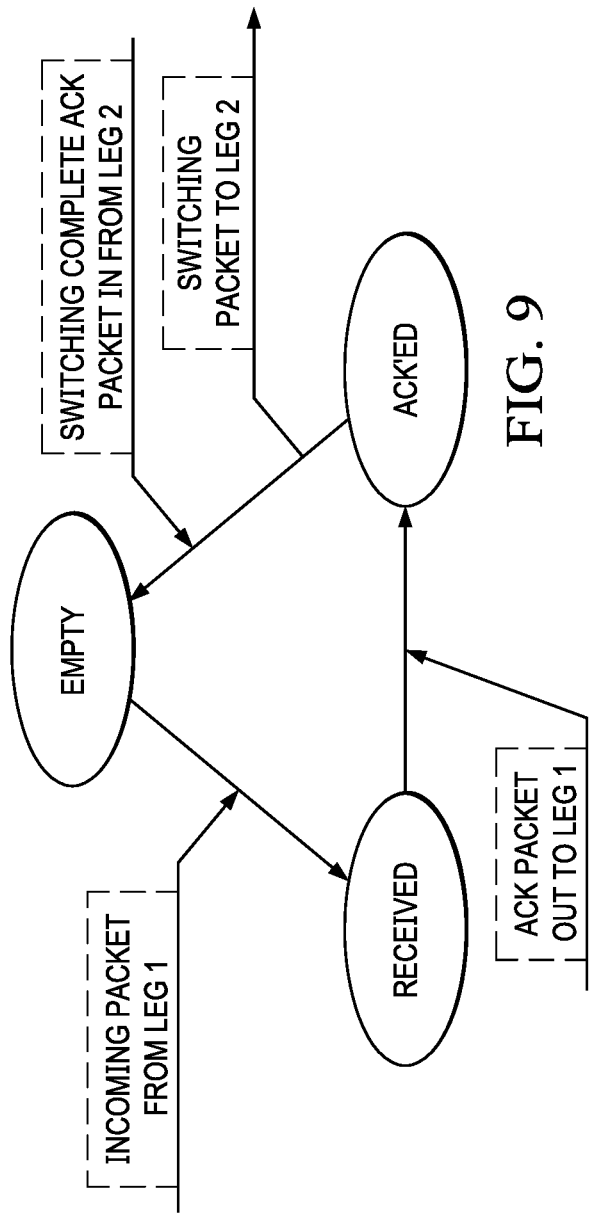
FIG. 9 depicts a slot state transition diagram for the management scheme of this disclosure.
Figure 10:
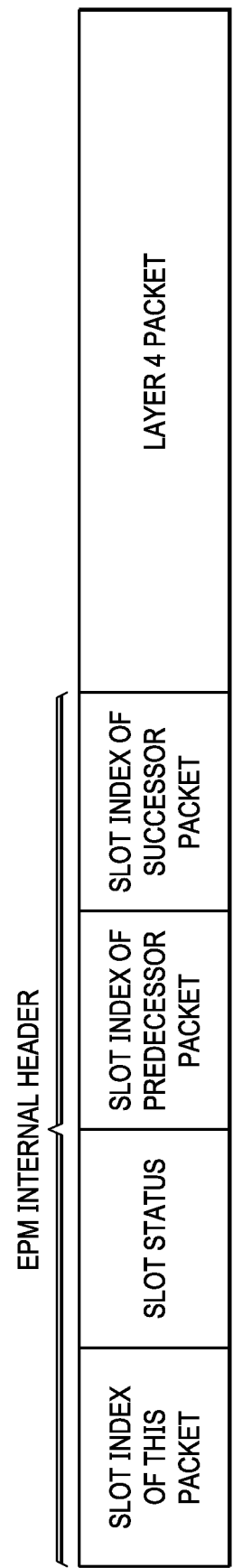
FIG. 10 depicts a representative internal header used in the scheme.

(1) Initialization
  (a) the memory space of T is allocated in the kernel
  (b) slot range Range=T/2B is calculated
  (c) Range is communicated down to the device driver
  (d) The device driver creates a slot_map indicating the status of each slot
  (e) The device driver creates a pointer variable $P_g$, which shows the next available slot index
(2) Slot Allocation for a New Incoming Packet
  (a) when the device driver transfers a new incoming packet to the kernel (from Connection 3 in FIG. 2 for example),
  (b) the device driver adds the EPM internal header (see, e.g., FIG. 10) to the transferring packet,
  (c) the EPM internal header has an information field for the slot index, a copy of $P_g$
  (d) the device driver changes $P_g$ to the next available slot index as modeled in FIG. 5
  (e) the device driver initially fills the slot index for the newly incoming packet and the status
  (f) successively, each Layer 4 switching entity fills the other fields, predecessor and successor packet indexes belonging to the same pair of connections
(3) Slot Status Change with an ACK Packet (Packet Receipt)
  (a) when the kernel creates a TCP ACK packet for the sender (e.g., Host C back to Host B on Connection 3 in FIG. 2)
  (b) the kernel adds the EPM internal header to the sending ACK packet down to the device driver
  (c) the EPM internal header has an information field, which contains the slot numbers (usually more than one due to the popular TCP optimization) that are received in sequence
  (d) the device driver updates the slot status accordingly into the slot_map
(4) Slot Recycling with Packet Switching
  (a) when the device driver receives an ACK packet from one TCP leg (e.g., Host A back to Host C on Connection 2 FIG. 2),
  (b) this event means that the switching of those packets is complete (e.g., from Connection 3 to Connection 2 in FIG. 2
  (c) the device driver delivers the ACK packet to the kernel
  (d) the kernel generates an interrupt to the receiver thread
  (e) the receiver thread updates its own switching status and communicates back with the device driver to inform the switching completion status of those packets
  (f) the device driver changes the slot status to empty in the slot_map accordingly Normally, the slot will be one of the three states; empty, occupied (received in or out of sequence), and ACK-ed (ready for switching), in this order. FIG. 9 depicts the state transition of the slot.

Operation Parameters

The following provides additional technical details of the EPM scheme:

(1) $P_g$, the Global Pointer:
  (a) It is the single global pointer shared by all readers and writers
  (b) The initial value can start at any value, e.g., 1
  (c) The pointer will eventually reach the last slot of the ring buffer
  (d) Then, the pointer will move to the next available slot wrapping around the large pool of slots, resulting in a logical ring buffer
  (e) The pointer proceeds in one direction so that it can maximize the time interval, in which the packet switching can normally be done without forcing the pointer skipping those slots occupied by packets still waiting for switching
(2) Per Connection Pointers:
  (a) the packets belonging to the same connection are linked by the slot index from one to the very next one, effectively forming a linked list (see, FIG. 10)
    a linked list is not the only implementation method, as a separate slot map for each pair of connections may be used in lieu of the linked list
  (b) out-of-order packets eventually become in-order by changing the slot pointers of related packets such that the packets do not move around
  (c) As packets continue to be switched, the slots occupied by waiting packets are moving forward in the same direction as the $P_g$ moves
(3) $S_{sentinel}$
  (a) EPM does not necessarily specify some values for $S_{sentinel}$
  (b) An optimal value can be chosen by observing EPM-produced data set from some observation period of interest
  (c) The range of optimal values, for example, may be dependent on the traffic mix on the link for the time period in question, or other factors The EPM technique provides significant advantages. As a skilled person will appreciate, EPM provides statistical multiplexing to the end point management. Unless incoming packet rates are otherwise constants, which is unlikely, EPM always better utilizes the given space. Considering burstiness, which is a general Internet characteristic, the utilization gain (based on EPM) is high. Indeed, the following are consequences of exercising statistical multiplexing with the end point: higher efficiency for link quality difference, higher efficiency for unpredictable variance of link quality difference, and higher accommodation of persistent connections. In addition to higher space utilization, another advantage is the scheme requires minimal switching overhead. As described, EPM moves the packet between the kernel and user spaces, nor between two end points. Once written, an incoming packet stays at the same location (slot) until the switching of the packet is complete.

In EPM, the device driver preferably is the entity that maintains the current status of slots. If two bits are used to represent the status of each slot, typically 25K Bytes are needed to represent 100K connections. The memory overhead for 25 KB is not substantial for modern computers for the high space utilization of Layer 4 switches. In comparison, the typical size of end point begins with 64 KB, followed by sizes doubled at each increase (128, 256, 512 KB, etc.). Many algorithms also exist for efficient bit operations. In EPM, the device driver changes the packet on its way incoming and out-going. The EPM internal header is added to each incoming packet. The internal header is removed from each out-going packet. The new overhead of adding and removing of the additional header with the bit operation should be light enough, a tiny fraction of the current overhead of moving around the packet itself between the kernel and user spaces, and, between two end points.

In the N×N layer 4 switch model (FIG. 3) is that each N is unique so that each pair is unique, too. By slightly violating the pairwise-ness, EPM can maintain more persistent connections. Imagine a Layer 4 switch, interfacing end users (clients) at one side and the Internet backbone at the other side. Assume that most of time, the number of end users is limited to some number $N_{eu}$, and the max number of possible backbone node is $N_{bb}$, where the following condition holds: $N_{eu} \ll N_{bb}$ In such a situation, EPM can maintain some large number of end point identifiers ($N_{bb}-N_{eu}$) without allocating slots. Because Layer 4 switching can only happen between a unique pair of end points, the max number of pairs are limited to $N_{eu}$. The large number of connection identifiers ($N_{bb}-N_{eu}$) form a large pool of potential end points at any time.

Figure 11:
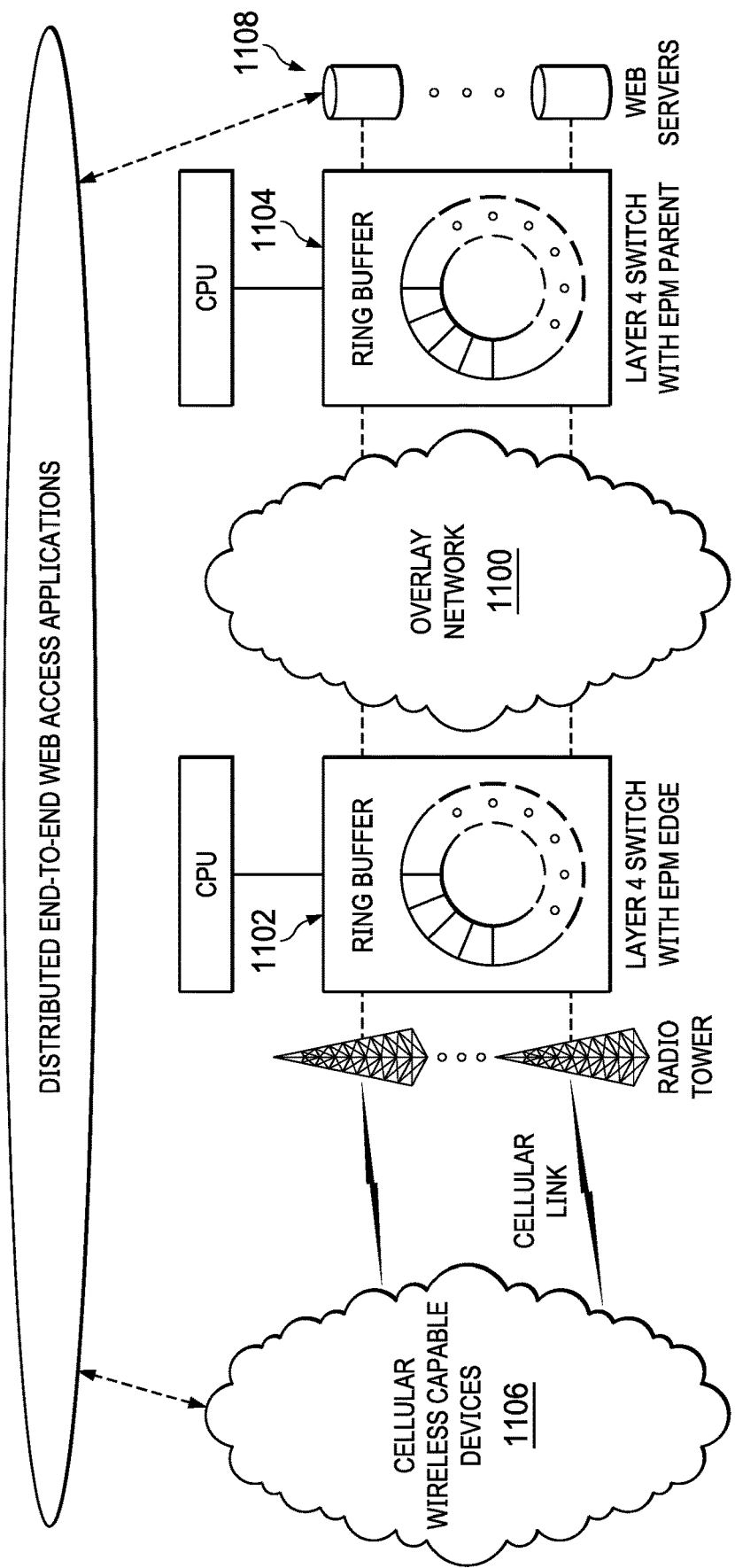
FIG. 11 depicts how L4 switches as implemented may be used in an operating environment wherein a cellular wireless link is coupled to an Internet-based distributed delivery network, such as a content delivery network (CDN).

FIG. 11 depicts a representative implementation scenario involving an overlay network, such as content delivery network 1100. As is well-known, such networks typically have a large number of overlay nodes. At least nodes 1102 and 1104 as depicted act like a Layer 4 switch in the manner described above. EPM makes the overlay nodes more efficient and more effective transport layer switches. As depicted, the Layer 4 switch 1102 interfaces devices 1106 on the cellular wireless link on one side, and the Layer 4 switch 1104 interfaces origin web servers 1108 on the wired Internet backbone. EPM also easily allows a large number of persistent connections between a pair of layer 4 switches (overlay nodes).

In a representative implementation, the subject EPM functionality is implemented in software, as one or more sets of computer program instructions executed by one or more hardware processors in one or more computing machines. There is no requirement that the machines be co-located.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an operating system and/or application layer solution, although this is not a limitation.

There is no limitation on the type of computing entity that may implement the connection control functionality of this disclosure. Any computing entity (system, machine, device, program, process, utility, or the like) may provide this operation.

As noted above, the techniques herein may be implemented to facilitate content delivery over a mobile network.

The technique herein may be implemented in other domains in which memory fragmentation is an issue. One such domain is operating system design wherein it is required to select an optimal page size for virtual memory.

What is claimed is as follows:

1. A method, comprising:
 configuring a memory space used by a plurality of end points for connection management as a logical ring buffer of slots, wherein a slot consists essentially of a network layer data packet together with an internal header, wherein an end point is structured as a collection of logically-consecutive slots into which data is written, the internal header maintaining logical consecutiveness of the collection, the logical ring buffer being shared by all admitted connections across the pairs of end points;
 maintaining, for each pair of end points associated with a connection, a set of pointers to the slots; and
 for at least a first connection, switching the first connection to a second connection by reading or writing packet data from the logical ring buffer using the set of pointers.

2. The method as described in claim 1 wherein particular slots constituting an end point are not physically-consecutive.

3. The method as described in claim 1 wherein the slots in the collection of logically-consecutive slots are associated to one another during switching using the pointers.

4. The method as described in claim 1 further including reserving a portion of the memory space for statistically-multiplexing end point allocations.

5. The method as described in claim 1 wherein switching the first connection to the second connection switches in-order packets from the first connection to the second connection without the in-order packets being moved from their logically-consecutive slots.

6. The method as described in claim 1 wherein a connection is a Transmission Control Protocol (TCP) connection.

7. The method as described in claim 6 wherein the network layer switching is implemented in an overlay network.

8. The method as described in claim 7 wherein the overlay network is a content delivery network (CDN).

9. The method as described in claim 7 wherein the first connection is associated with a cellular wireless link and the second connection is associated with a wired link.

10. Apparatus, comprising:
a processor;
computer memory holding computer program instructions, the computer program instructions comprising:
program code configuring a memory space used by a plurality of end points for connection management as a logical ring buffer of slots, wherein a slot consists essentially of a network layer data packet together with an internal header, wherein an end point is structured as a collection of logically-consecutive slots into which data is written, the internal header maintaining logical consecutiveness of the collection, the logical ring buffer being shared by all admitted connections across the pairs of end points;
program code maintaining, for each pair of end points associated with a connection, a set of pointers to the slots; and
program code switching a first connection to a second connection by reading or writing packet data from the logical ring buffer using the set of pointers.

11. The apparatus as described in claim 10 wherein particular slots constituting an end point are not physically-consecutive.

12. The apparatus as described in claim 11 wherein the logically-consecutive slots in the collection of slots are associated to one another during the switch using the pointers.

13. The apparatus as described in claim 10 wherein the computer program instructions further include program code to reserve a portion of the memory space for statistically-multiplexing end point allocations.

14. The apparatus as described in claim 10 wherein the first connection is switched to the second connection by switching in-order packets from the first connection to the second connection without the in-order packets being moved from their logically-consecutive slots.

15. The apparatus as described in claim 10 wherein a connection is a Transmission Control Protocol (TCP) connection.

16. The apparatus as described in claim 10 wherein the apparatus is an edge server implemented in an overlay network.

17. The apparatus as described in claim 10 wherein the first connection is associated with a cellular wireless link and the second connection is associated with a wired link.

* * * * *